United States Patent

[11] 3,630,478

[72] Inventor Otto Klepp
Buchengasse 111-113, Vienna, Austria
[21] Appl. No. 37,758
[22] Filed May 15, 1970
[45] Patented Dec. 28, 1971

[54] SEAT STRUCTURE FOR AGRICULTURAL TRACTOR
8 Claims, 4 Drawing Figs.

[52] U.S. Cl. ................................................. 248/376, 248/280, 248/204
[51] Int. Cl. ........................................................ A47c 7/00
[50] Field of Search ........................................... 248/123, 204, 280, 281, 376

[56] References Cited
UNITED STATES PATENTS

| | | | |
|---|---|---|---|
| 834,104 | 10/1906 | Borden | 248/280 |
| 1,100,652 | 6/1914 | Brooks | 248/376 X |
| 3,376,008 | 4/1968 | Tschursch | 248/376 |

Primary Examiner—William H. Schultz
Attorney—Kurt Kelman

ABSTRACT: A housing has a rear wall, which is remote from a seat bucket, an upper spring abutment, and two extensions extending laterally away from said spring abutment. Generally vertical compression spring means engage said spring abutment. A linkage having the configuration of a four-bar linkage comprises lower links and an approximately U-shaped element which comprises upper links and a web, which connects said upper links and is rotatably mounted in said rear wall and carries a nose extending through said window and two forwardly directed bearing arms, which bear on said extensions. Said linkage supports said seat bucket on said compression spring means. A locking hook is mounted in said housing and biased by a biasing spring to a locking position, in which said spring housing overlies said nose and prevents an upward pivotal movement of said lower links and seat bucket beyond a predetermined seating position. A lever is manually operable to move said locking hook out of said locking position against the force of said biasing spring.

Patented Dec. 28, 1971

INVENTOR.
OTTO KLEPP
BY
AGENT

Patented Dec. 28, 1971

INVENTOR.
OTTO KLEPP
BY
AGENT

SEAT STRUCTURE FOR AGRICULTURAL TRACTOR

This invention relates to a seat structure for a tractor, which seat structure comprises a seat bucket, which is secured to upper and lower links arranged in the configuration of a four-bar linkage and by such links is supported on at least one approximately vertical compression spring, which is enclosed by a housing and preferably adjustable in initial stress, and a locking hook, which prevents an upward pivotal movement of the links and seat bucket beyond the seating position.

Such seat structures for agricultural tractors and the like are already known but are relatively expensive in structure. Besides, the parts of the structure are not sufficiently protected from the influence of the weather and from foreign matter. When the locking hook has been released, the seat bucket can be pivotally moved upwardly with the aid of the links so that the driver of the tractor can get more easily on the seat and can leave the same after travel. During travel, the locking hook should prevent an excessive upward pivotal movement and limit the range of the pivotal movement of the links during operation to the extent which is required. This locking hook is disposed close to the seat bucket and substantially spaced from the spring housing so that the structure is not as compact as desired and there are additional parts which are not protected.

It is an object of the invention so to improve the above-described seat structure for a tractor that the structure is simplified and compact and there are no important parts which are unprotected from the influences of the weather and the inevitable foreign matter.

This object is essentially accomplished according to the invention in that the upper links are combined to form an approximately U-shaped element, which has a web that is rotatably mounted in the rear wall of the spring housing, which rear wall is remote from the seat bucket, said web carries two forwardly directed bearing arms, which bear on extensions, which extend laterally away from the spring housing from an upper spring abutment or the like member, which is engaged by the compression spring, said web is also provided with a nose, which extends through a window in the rear wall into the spring housing, and the locking hook is mounted in the spring housing and by means of a manually operable lever is adapted to be swung away against the force of a spring and overlies said nose. The combination of the two upper links in a single U-shaped element results in a simplified structure because the separate bearings which would otherwise be required for the two upper links are eliminated. The web of the U-shaped element forms the pivot for the upper links, which by means of the bearing arms bear on the lateral extensions of the spring abutment for the compression spring so that only these extensions must protrude from the spring housing whereas the spring itself is accommodated in and protected by the housing. The nose which is provided on the web of the U-shaped element that is formed by the upper links extends into the spring housing so that the locking hook can also be mounted in that housing and a compact structure results, all functionally significant parts of which are combined in or at the spring housing. An upward or downward pivotal movement of the links causes the web of the U-shaped element to rotate in its bearing at the rear wall of the spring housing so that the forces acting on the links are transmitted from the bearing arms to the compression spring. The rotational movement in the sense of an upward pivotal movement of the links is limited because the nose provided on the web engages the locking hook when the links have been pivotally moved to their uppermost position. Only if the locking hook is swung away against the spring force by means of the handle or manually operable lever can the nose move to a still higher position so that the seat bucket can now be swung upwardly beyond its seating position.

In a further embodiment of the invention, a rocker lever is provided, which acts at one end on the web of the U-shaped element formed by the upper links and at the other end on the upper connecting eye of a shock absorber, which is pivoted to the spring housing or the baseplate of the spring housing, and said rocker lever is fulcrumed on an extension of the upper spring abutment. This arrangement enables a highly desirable mounting of a vibration-damping shock absorber, which is also disposed close to the spring housing so that said shock absorber does not constitute a disturbing component.

It will be suitable if the extensions of the upper spring abutment consist of bearing pins, which are welded to the spring abutment, and rollers, which are mounted on the bearing pins, and the bearing arms have semicircular recesses, which conform to the rollers so that the frictional forces are minimized.

Below the extensions of the spring abutment, buffers of resilient material may be mounted on inner brackets or the like carried by the sidewalls of the spring housing and these buffers may limit the downward pivotal movement of the links in the case of very strong shocks.

Within the scope of the invention, an additional spring may be provided, which acts on the lower links and tends to impart an upward pivotal movement thereto, and which preferably consists of a helical torsion spring, which is wound on the common pivot for the lower links and has one end arm which bears on a strut, which connects the lower links, and an opposite end arm, which bears on the spring housing, so that the seat will be automatically swung up beyond its seating position as soon as the locking hook has been released.

An embodiment of the invention is shown by way of example on the accompanying drawings, in which.

Figure 1:
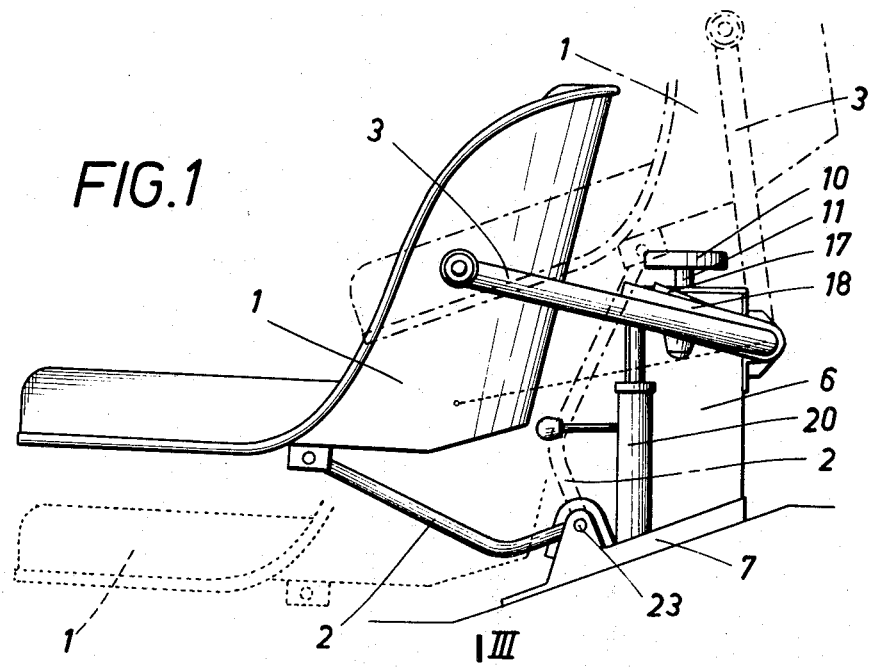
FIG. 1 is a side elevation showing a seat structure for a tractor.
Figure 2:
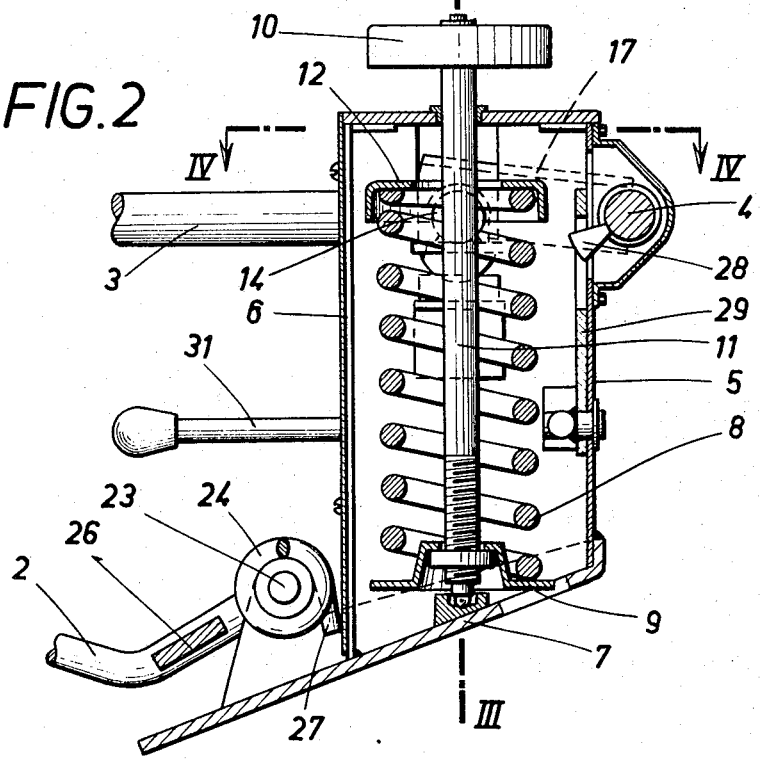
FIG. 2 is an enlarged vertical sectional view taken on line II—II of FIG. 3 through the spring housing.

The seat bucket 1 of the tractor seat structure according to the invention is secured to lower links 2 and upper links 3, which are arranged in the configuration of a four-bar linkage. The upper links 3 are combined to form an approximately U-shaped element, which has a web 4 forming a pivot for the two upper links 3 and rotatably mounted on the rear wall 5 of a spring housing 6. The spring housing 6 is mounted on a baseplate 7 and encloses a helical compression spring 8, which bears on a lower spring abutment 9. The latter can be adjusted by means of a screw 11, which upwardly protrudes out of the housing 6 and is provided there with a handwheel 10. This arrangement enables an adjustment of the initial stress of the compression spring 8. The upper spring abutment 12 comprises two diametrically opposite extensions, which consist of bearing pins 13, 14, which are welded to the spring abutment 12, protrude laterally from the housing 6, and carry rollers 15, 16. Forwardly extending bearing arms 17 are provided on the web 4 of the U-shaped element which is formed by the upper links 3. These bearing arms bear by means of the pins 13, 14 on the upper spring abutment 12. The bearing arms 17 have semicircular recesses, which conform to the rollers 15, 16. A loading of the seat bucket 1 is thus transmitted by the upper links 3 and the bearing arms 17 to the compression spring 8.

A rocker lever 18 is connected to the roller 15 and acts at one end on the web 4 of the U-shaped element formed by the upper links 3 and at the other end on the upper connecting eye 19 of a shock absorber 20, which is pivoted to the baseplate 7. Inner brackets 21 disposed in the spring housing 6 carry rubber buffers 22 for limiting the distance by which the upper spring abutment 12 and the bearing pins 13, 14 can be lowered. A helical torsion spring 24 is wound on the common pivot 23 of the lower links 2 and has one end arm 25 bearing on a strut 26, which connects the lower links 2, and another end arm 27, which bears on the spring housing 6. Hence, the lower links tend to move pivotally upwardly as far as possible.

Figure 3:
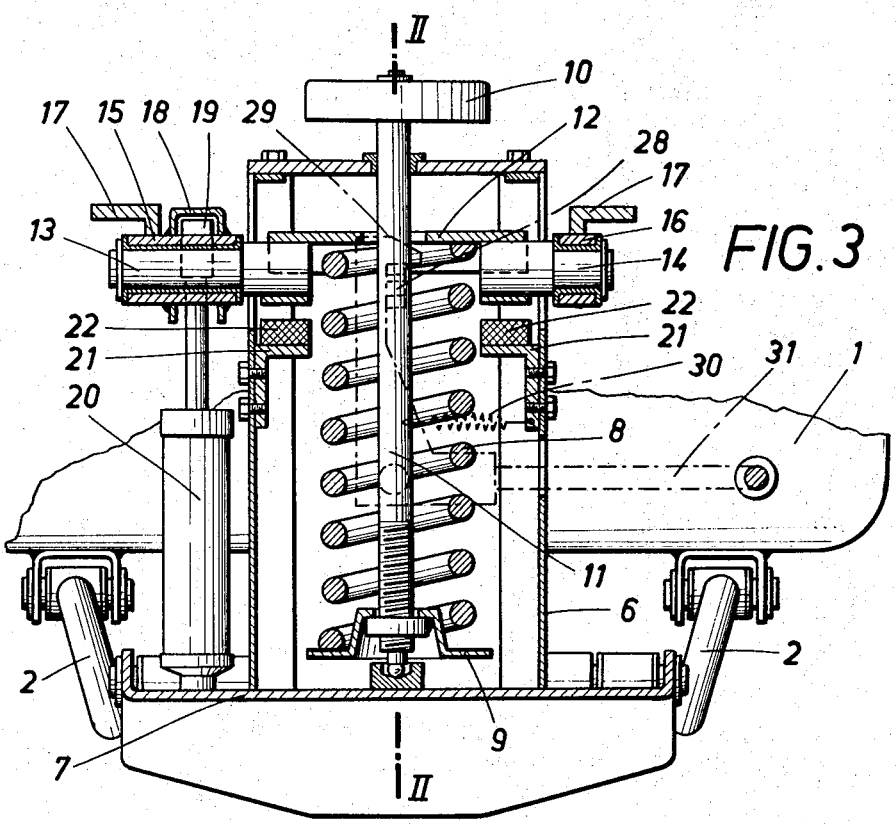
FIG. 3 is a vertical sectional view taken on line III—III of FIG. 2
Figure 4:
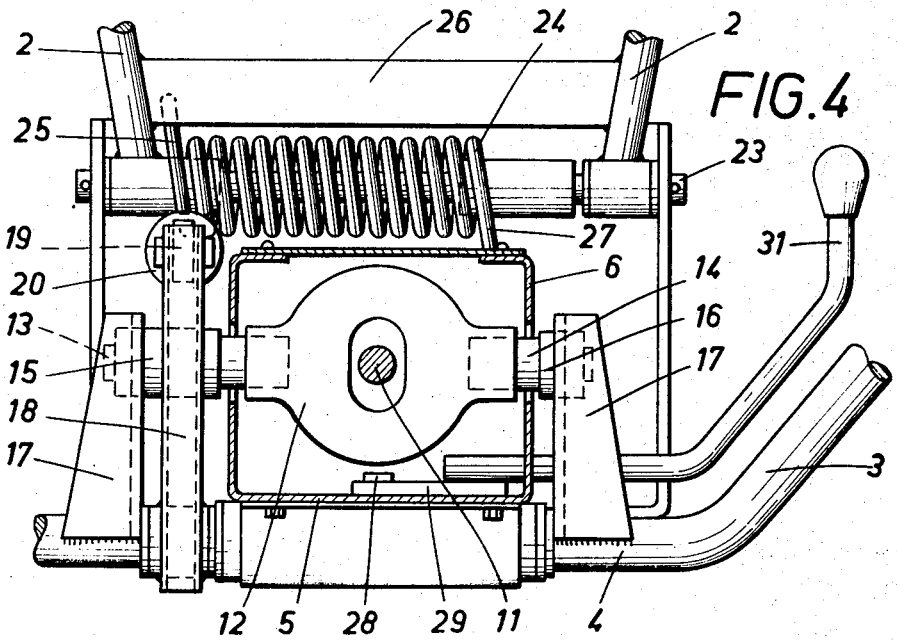
FIG. 4 is a horizontal sectional view taken on line IV—IV of FIG. 2.

The usual seating position of the seat bucket is shown in solid lines in FIG. 1. A substantial depression against the spring force results in the position which is indicated in dotted lines. The spring 24 tends to impart to the seat bucket a pivotal movement beyond the seating position to the position indicated in dash-dot lines, in which the driver can get more easily on and from the seat. To ensure that the seat cannot move upwardly beyond its normal seating position, a nose 28 is secured to the web 4 of the U-shaped element formed by the upper links 3 and a locking hook 29 overlies said nose and is mounted within the housing 6 and is held in its locking position by a spring 30. The locking hook 29 is connected to a hand lever 31, by which the locking hook 29, which is shown in dash-dot lines in FIG. 3, can be pivotally moved in the counterclockwise sense against the force of the spring 30 so that the hook no longer overlies the nose 28 and the seat bucket 1 and the links 2, 3 can perform an upward pivotal movement beyond the seat position. This pivotal movement is assisted by the spring 24.

What is claimed is:

1. A seat structure for a tractor, which comprises a seat bucket,
    a housing having a rear wall, which is remote from the seat bucket, an upper spring abutment, and two extensions extending laterally away from said spring abutment,
    generally vertical compression spring means engaging said spring abutment,
    a linkage having the configuration of a four-bar linkage and comprising lower links and an approximately U-shaped element, which comprises upper links and a web, which connects said upper links and is rotatably mounted in said rear wall and carries a nose extending through said window and two forwardly directed bearing arms, which bear on said extensions, said linkage supporting said seat bucket on said compression spring means,
    a biasing spring,
    a locking hook, which is mounted in said housing and biased by said biasing spring to a locking position, in which said spring housing overlies said nose and presents an upward pivotal movement of said lower links and seat bucket beyond a predetermined seating position, and
    a lever which is manually operable to move said locking hook out of said locking position against the force of said biasing spring.

2. A seat structure as set forth in claim 1, which comprises means for adjusting the initial stress of said compression spring means.

3. A seat structure as set forth in claim 1, which comprises
    a shock absorber which is pivoted to said spring housing and comprises an upper connecting eye, and
    a rocker lever which is fulcrumed on one of said extensions and has a first end acting on said web and a second end acting on said upper connecting eye.

4. A seat structure as set forth in claim 3, in which
    said spring housing comprises a baseplate and
    said shock absorber is pivoted to said baseplate.

5. A seat structure as set forth in claim 1, in which
    said extensions consist of bearing pins, which are welded to said spring abutment, and rollers, which are mounted on said bearing pins, and in which
    said bearing arms have semicircular recesses, which conform to said rollers.

6. A seat structure as set forth in claim 1, in which
    said spring housing comprises sidewalls which carry inner brackets and
    buffers of resilient material are mounted on said inner brackets and disposed below said extensions.

7. A seat structure as set forth in claim 1, which comprises
    an additional spring, which acts on said lower links and tends to impart an upward pivotal movement thereto.

8. A seat structure as set forth in claim 7, in which
    said lower links have a common pivot and are connected by a strut, and
    said additional spring consists of a helical torsion spring, which is wound on said common pivot and has a first end arm which bears on said strut and a second end arm which is opposite to said first end arm and bears on said spring housing.

* * * * *